Dec. 1, 1931.  F. D. CHAPMAN  1,834,047
CORN SILKER
Filed March 8, 1929   2 Sheets-Sheet 1
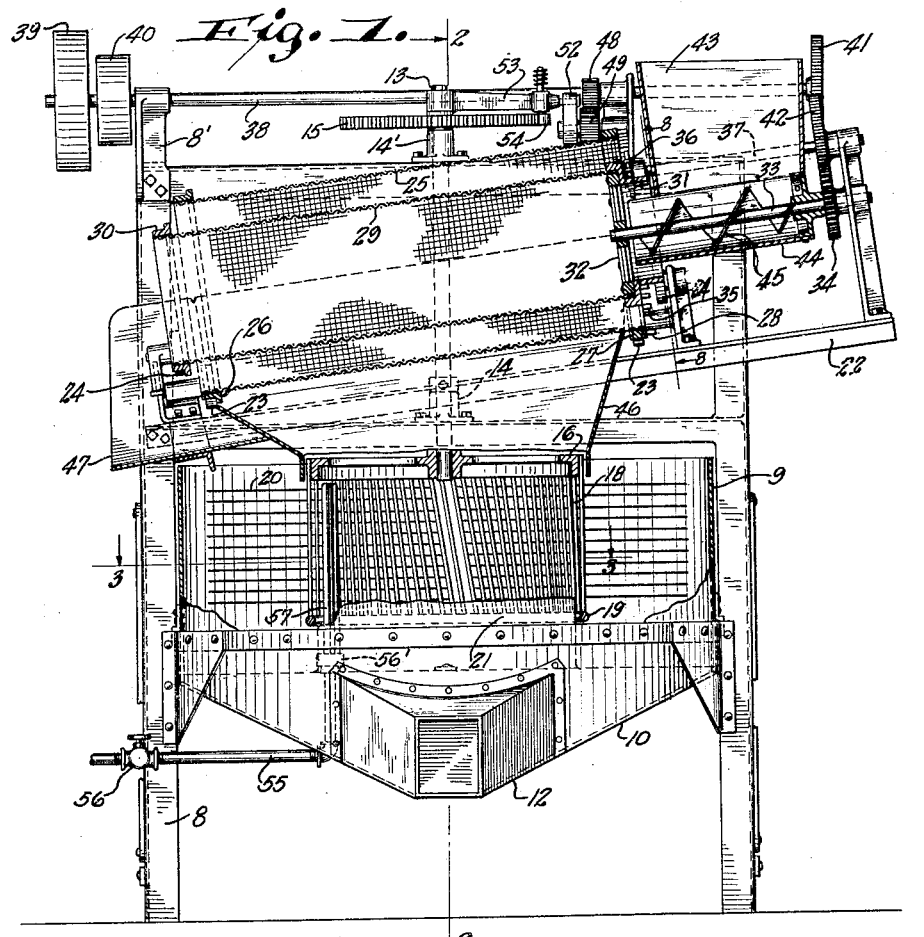
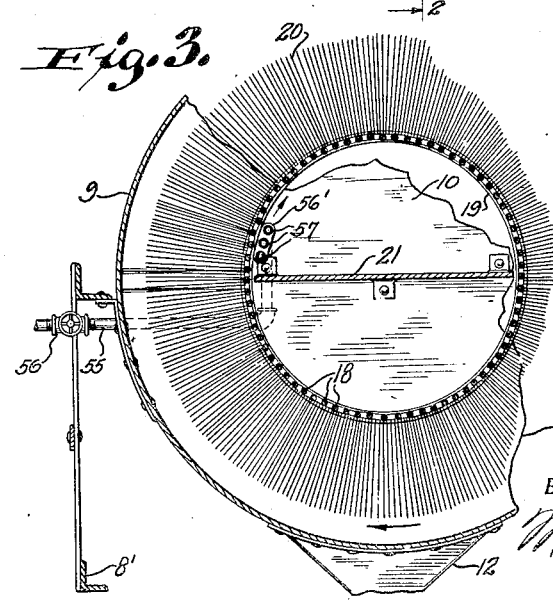
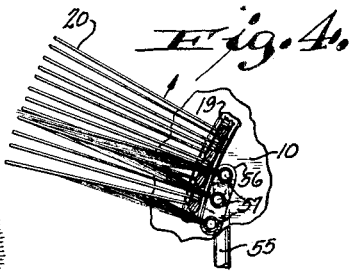
INVENTOR.
Frank D. Chapman,
BY
Morsell, Keeney & Morsell
ATTORNEYS.

Dec. 1, 1931.  F. D. CHAPMAN  1,834,047
CORN SILKER
Filed March 8, 1929   2 Sheets-Sheet 2
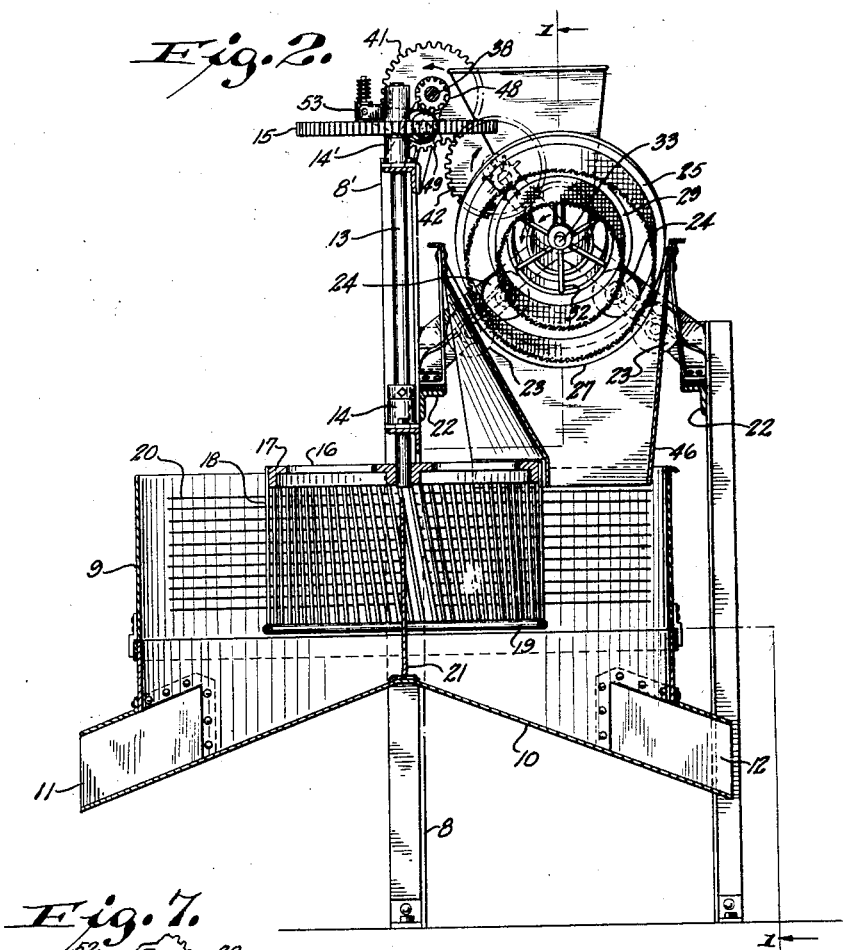
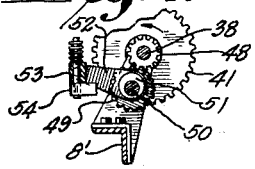
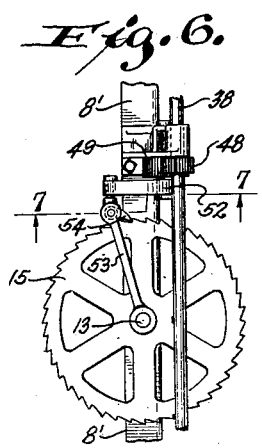
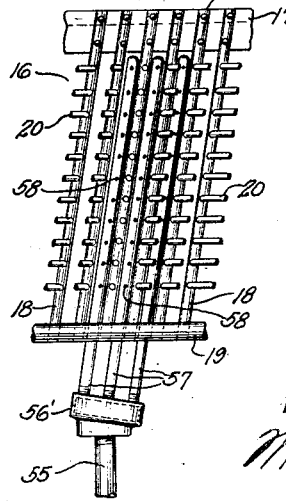
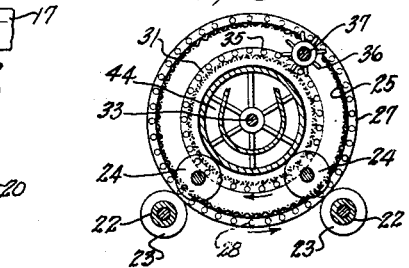
INVENTOR.
Frank D. Chapman.
BY
Morsell, Keeney & Morsell.
ATTORNEYS.

Patented Dec. 1, 1931

1,834,047

UNITED STATES PATENT OFFICE

FRANK D. CHAPMAN, OF BERLIN, WISCONSIN

CORN SILKER

Application filed March 8, 1929. Serial No. 345,407.

This invention relates to improvements in corn silker.

It is one of the objects of the present invention to provide a corn silker in which a hydraulic means is used for dislodging the silk from the removing members.

A further object of the invention is to provide a corn silker having intermittently movable silk removing members for separating the silk from the kernels of corn and in which the silk is automatically cleaned from the members during each revolution of said members and without the necessity of stopping the machine.

A further object of the invention is to provide a corn silker in which the silk and other foreign particles are removed from the flowing stream of corn by intermittently rotated radially extending tines, and the silk and foreign particles are removed from the tines by jets of water in a very simple manner.

A further object of the machine is to provide a corn silker having radial tines which are in spiral formation to form the tines in staggered relation vertically.

A further object of the invention is to provide a corn silker having means for separating cobs or other foreign matter from the kernels of corn before said kernels are engaged by the desilking tines of the machine.

A further object of the invention is to provide a corn silker which is of simple construction, is strong and durable and is well adapted for the purpose described. With the above and other objects in view the invention consists of the improved corn silker and its parts and combinations as set forth in the claims and all equivalents thereof.

In the accompanying drawings in which the same reference characters indicate the same parts in all of the views:

Fig. 1 is a vertical sectional view of the improved corn silker taken on line 1—1 of Fig. 2;

Fig. 2 is a central vertical sectional view taken on line 2—2 of Fig. 1;

Fig. 3 is a horizontal sectional detail view taken on line 3—3 of Fig. 1;

Fig. 4 is a horizontal sectional detail view on a larger scale of some of the silk removing tines and the spray means for removing the silk therefrom;

Fig. 5 is a front view of the parts shown in Fig. 4;

Fig. 6 is a top view of the means for intermittently operating the silk removing element of the machine;

Fig. 7 is a sectional detail view taken on line 7—7 of Fig. 6; and

Fig. 8 is a transverse section through the silker, taken on line 8—8 of Fig. 1.

Referring to the drawings the numeral 8 indicates a rectangular frame having one portion 8' extending to a greater height than the other. A cylindrical tank or receptacle 9 is supported midway of the height of the frame and its central portion is positioned between the higher frame members 8'. The bottom portion 10 of the receptacle from a point centrally of the receptacle and in alinement with the higher frame members 8' inclines downwardly, outwardly to opposite discharge spouts 11 and 12 formed on the opposite sides of the receptacle. The spout 11 is adapted to discharge the silk, water and other foreign particles while the spout 12 discharges the kernels of corn. A vertical shaft 13 extends centrally between the frame members 8' and upwardly through and is journaled in bearings 14 and 14' mounted on the frame, and above the bearings 14' is provided with a ratchet wheel 15. The lower end portion of the shaft 13 below the lower bearing 14 carries a silk removing cage or wheel member 16 in the form of an upper wheel or spider 17 to which are connected the upper ends of downwardly and obliquely extending spaced rods 18. The lower ends of said rods are connected to a ring 19 spaced a short distance above the angular bottom portion 10. This assembly forms a cage-like structure entirely open at its lower end. Tines 20 formed of thin rods or wire are connected in spaced relation vertically to the rods 18 and extend approximately radially outwardly therefrom. Due to the oblique angle of the rods 18 the upper tines of one rod will overlap the lower tines of the next adjacent rod in the direction of travel of the removing member 16 to form an uninterrupted line of tines during the rotation of said member.

A partition 21 mounted on the higher central portion of the bottom part 10 extends upwardly into the silk removing member 16 and divides the space within said member into two compartments extending longitudinally of the machine. The said partition is slightly less in size than the interior of the removing member in order not to interfere with the rotation of the said removing member.

On the corn spout side of the machine and above the removing member tines 20 is formed a downwardly inclined supplemental frame 22 provided with bearing rollers 23 and 24. A tubular open ended and downwardly inclined screen member 25 is journaled on the rollers 23 and at its lower end is formed with a flanged band 26 which bears on the lower rollers 23 and maintains the screen member in position. The upper end of the screen member is also provided with a band 27 which bears on the upper rollers 23, and said band is provided with gear pins 28 by means of which the screen member is rotated.

A second or inner tubular open ended screen member 29 extends concentrically through the outer screen member 25 and at its lower end is provided with a flanged band 30 which bears on the lower rollers 24 to support and maintain said inner screen member in position. The upper end of the inner screen member is provided with a flanged band 31 which bears on the upper rollers 24. Said upper end is also provided with a spoked head or member 32 to which a shaft 33 is connected. The shaft extends outwardly and is journaled in the supplemental frame and adjacent the bearing portion of said frame the shaft has mounted thereon a gear 34 for rotating the shaft and the inner screen member 29. The flanged band 31 is also provided with gear pins 35 similar to the pins 28 and a pin gear 36 journaled on a shaft 37 extending through the supplemental frame is in mesh with both pin gears and transmits rotation in a reverse direction from the inner to the outer screen member.

A main drive shaft 38 journaled on the upper portion of the frame and extending from one end of the machine to the other is provided with drive pulleys 39 and 40 on one end and a gear 41 at its opposite end which is in mesh with a gear 42 mounted on the shaft 37. Said gear 42 is in mesh with the gear 34 before mentioned to transmit rotation from the main shaft 38 to the spiral member shaft 33.

A hopper 43 positioned above the shaft 33 is formed with a lower chute portion 44 which extends around the shaft 33 and into the open flanged end of the inner screen member 29 to feed the corn from the hopper into the inner screen member. A spiral or other conveyer means 45 may be mounted on the shaft 33 within the chute 44 to move the corn therethrough and into the inner screen member 29.

The lower half portion of the outer screen member is inclosed by a casing or hopper member 46 which directs the flow of kernels of corn and silk directly upon the tines on the side of the remover cage adjacent the corn discharge spout 12. A chute 47 encircling the lower half rear end portion of the outer screen member and projecting outside of the case 9 directs cobs, silk and other foreign matter not passing through the meshes of the screen members outwardly from the casing 9.

The drive shaft 38 is also provided with a small gear or pinion 48 which is in mesh with a small gear 49 journaled on a stud shaft 50 projecting from the frame 8'. Said gear or pinion 49 is formed with a projecting eccentric portion 51 which is engaged by a link 52. The outer end of the link is pivotally connected to the outer end of an arm 53 which is fulcrumed on the shaft 13 of the ratchet wheel 15. A spring actuated pawl 54 pivotally connected to the outer end portion of the arm 53 engages the teeth of the ratchet wheel 15 to intermittently rotate the ratchet wheel and the silk remover cage 16.

A water supply pipe 55 controlled by a valve 56 is provided with an angle fitting 56' from which three spaced jet tubes or pipes 57 project. Said tubes extend upwardly within the cage and at angles parallel to the angles of the cage bars 18 and adjacent thereto. The tubes are spaced apart predetermined distances with respect to the cage bars, and the jet openings 58 are arranged in horizontal alinement with the tines 20 so that the jets of water from the tubes will strike the opposite sides of the tines close to the rods 18 and force the silk or other foreign matter outwardly and off the ends of the tines. As thus arranged each tine will first be subjected to a single jet of water close to the rod 18 to which it is connected to start the movement of the silk or foreign matter outwardly. A further intermittent movement of the cage 16 will advance the tine between the next two water tubes 57 and the jets of water from these tubes will impinge against opposite sides and along the length of the tine and cause a further movement of the silk or foreign matter along the tine until it drops off the outer end and is discharged with the water through the spout 11. The intermittent movement of the remover cage is timed so that at each period of rest the adjacent rods will be positioned in staggered relation to the water tubes to receive the jets of water while the cage is at rest and as the jets will force the water approximately parallel to and along the length of the tines all of the silk and foreign matter will be removed therefrom.

In use the corn or other like material is supplied to the hopper and will be moved by the conveyer 45 therethrough and into the inner rotary screen member 29. This screen member will permit the kernels of corn to pass through the screen and into the outer rotary screen and the cobs and some of the silk which has been screened from the corn will be discharged from the lower end of the inner screen on to the discharge chute 47 and in turn be discharged therefrom from the machine. The outer rotary screen will also separate some of the foreign matter from the corn and it will also be discharged into the chute 47. The kernels of corn will flow from the outer rotary screen into the hopper 46 and said hopper will direct the corn in a steady stream upon the tines 20 on the side of the cage 16 adjacent the discharge chute 12.

As the oblique arrangement of the rods 18 will position the tines of one rod in overlapping relation, vertically with respect to the tines of the next adjacent rod the kernels of corn will follow a zigzag course in passing between the tines and all of the silk be removed therefrom and retained on the tines. The kernels of corn will flow upon the inclined bottom portion 10 and be discharged through the corn chute 12 for other disposition.

The tines carrying the silk will be moved into register with the jets of water which will force the silk from ends of the tines as before described. As the cage or reel is intermittently rotated the period of time the tines are at rest while in register with the jets is sufficient to permit the water to force the silk or other foreign matter from the tines, and the silk will be discharged with the water through the discharge chute 11.

From the foregoing description it will be seen that the corn silker is of very simple construction and is well adapted for the purpose described.

What I claim as my invention is:

1. A corn silker, comprising a rotary cage member having oblique vertically extending rods provided with approximately radially extending laterally moving tines, means for directing a stream of corn downwardly on and between the tines on one side portion of the cage member, and means extending within the cage for directing jets of water outwardly through another side portion of the cage member and on opposite sides of one of the obliquely extending rods and along the tines thereof to discharge the silk from the tines at their end portions.

2. A corn silker, comprising a frame, a receptacle having discharge spouts, a rotary cage member having a vertically extending shaft journaled in the frame, said cage member also having oblique vertically extending rods provided with outwardly projecting tines which are staggered vertically, a downwardly inclined rotary screen positioned above the tines on one side of the cage member for screening corn and discharging the corn in a stream upon the tines to remove the silk from the corn, means for intermittently rotating the cage member, means for rotating the screen, and means extending into the cage member for directing jets of water outwardly through another side portion of the cage and on opposite sides of one of the obliquely extending rods and along the tines thereof to discharge the silk from the tines at their end portions.

3. A corn silker, comprising a frame, a receptacle having discharge spouts, a rotary cage member having a vertically extending shaft journaled in the frame, said cage member also having oblique vertically extending rods provided with outwardly projecting tines which are staggered vertically, a pair of concentric downwardly inclined rotary screens positioned above the tines on one side of the cage member for screening the corn and discharging the corn in a stream between the tines to remove the silk from the corn, means for intermittently rotating the cage member, means for rotating the screens in opposite directions, and perforated pipes extending into the cage member for directing jets of water between the oblique bars and along the opposite sides of the tines of one of the oblique rods.

4. A corn silker, comprising a frame, a receptacle having oppositely inclined bottom portions and discharge spouts and a central vertical partition, a rotary cage member having an open bottom portion which extends around the partition and also having a vertically extending shaft which is journaled in the frame, a ratchet wheel mounted on the frame, said cage member also having oblique vertically extending spaced rods provided with spaced outwardly projecting tines which are staggered vertically, a pair of downwardly inclined rotary screens positioned above the tines on one side of the cage member for screening corn and discharging the corn in a stream upon the tines to remove the silk from the corn, perforated tubes extending into the cage and positioned to direct jets of water along some of the tines on one side of the partition to remove silk from said tines, one of said screens extending through the other, a hopper for feeding corn into the inner screen, a hopper for directing corn from the outer screen on to the tines on the opposite side of the partition to that occupied by the tubes, a main driving shaft having a geared driving means with the inner screen, a geared connection between the two screens for rotating the outer screen in a reverse direction to the direction of rotation of the inner screen, and a pawl means actuated by the main shaft and engaging the ratchet wheel for intermittently rotating the cage member.

5. A corn silker, comprising a frame, a receptacle having oppositely inclined bottom portions and discharge spouts and a central vertical partition, a rotary cage member having an open bottom portion which extends around the partition and also having a vertically extending shaft which is journaled in the frame, a ratchet wheel mounted on the frame, said cage member also having oblique vertically extending spaced rods provided with spaced outwardly projecting tines which are staggered vertically, a pair of downwardly inclined rotary screens positioned above the tines on one side of the cage member for screening corn and discharging the corn in a stream upon the tines to remove the silk from the corn and discharge it through the adjacent discharge spout, rollers upon which the screens are supported, perforated tubes extending into the cage and positioned to direct jets of water along some of the tines on one side of the partition to remove silk from said tines, one of said screens extending through the other, a hopper for feeding corn into the inner screen, a hopper for directing corn from the outer screen on to the tines on the opposite side of the partition to that occupied by the tubes, a main driving shaft having a geared driving means with the inner screen, a geared connection between the two screens for rotating the outer screen in a reverse direction to the direction of rotation of the inner screen, and a pawl means actuated by the main shaft and engaging the ratchet wheel for intermittently rotating the cage member.

6. A corn silker comprising a hopper, a rotary screen for receiving corn from the hopper, a rotary member formed in part of obliquely extending rods having spaced tines projecting therefrom in staggered relation vertically for laterally intercepting the stream of corn from the screen and removing the silk from the corn, and perforated tubular means in parallel relation to the rods for directing jets of water along the tines to remove the silk therefrom at their end portions.

7. A corn silker comprising, a movable carrier having a plurality of tines projecting therefrom and movable thereby along fixed substantially horizontal planes, said tines being supported only at the carrier ends thereof and having free opposite ends, means for directing a stream of corn downwardly upon said tines to cause the same to catch and to remove silk from the kernels, and means for subsequently directing jets of water along said tines toward the free ends thereof to remove the accumulated silk.

8. A corn silker comprising, an endless carrier having a plurality of tines projecting therefrom and movable thereby along fixed paths with the tines maintained in substantially horizontal position, said tines being supported only at the carrier ends thereof and having free opposite ends, means for precipitating corn over said tines to cause the same to catch and to remove silk from the kernels, and means for directing jets of water along said tines toward the free ends thereof to remove the accumulated silk.

9. A corn silker comprising, means for supporting a plurality of tines at their inner ends only and for moving the same in succession along fixed substantially horizontal planes, means for precipitating corn over said tines to cause the same to catch and to remove silk from the kernels, and means for subsequently directing jets of water along said tines toward the unobstructed free ends thereof to remove the accumulated silk.

10. A corn silker comprising, means for supporting a plurality of superimposed staggered series of tines and for moving the tines of each series in succession along a fixed substantially horizontal plane, means for precipitating corn over said tines to cause the same to catch and to remove silk from the kernels, and means for subsequently directing jets of water along said tines toward the unobstructed free ends thereof to remove the accumulated silk.

11. A corn silker comprising, an endless carrier having a plurality of tines projecting therefrom and movable laterally thereby, means for precipitating corn over said tines on one side of said carrier to cause said tines to catch and to remove silk from the kernels, and means for directing jets of water along said tines toward the free ends thereof on the opposite side of said carrier to remove the accumulated silk.

12. A corn silker comprising, an endless carrier having a plurality of superimposed staggered series of tines movable laterally and substantially horizontally by said carrier, means for precipitating corn over said tines on one side portion of said carrier to cause said tines to remove silk from the kernels, and means for directing jets of water along said tines toward the free ends thereof on another side portion of said carrier to remove the accumulated silk.

In testimony whereof, I affix my signature.

FRANK D. CHAPMAN.